Nov. 4, 1969  A. NATER ET AL  3,476,084
LIVE-HAUL POULTRY TRAILER
Filed Jan. 20, 1967  4 Sheets-Sheet 1

INVENTORS.
ABE NATER
HUGH J. SCARBOROUGH
By Miketta, Glenny, Poms & Smith
ATTORNEYS.

Nov. 4, 1969

A. NATER ETAL 3,476,084

LIVE-HAUL POULTRY TRAILER

Filed Jan. 20, 1967

INVENTORS.
ABE NATER
HUGH J. SCARBOROUGH

By Miketta, Glenny, Poms & Smith

ATTORNEYS.

Nov. 4, 1969 A. NATER ETAL 3,476,084
LIVE-HAUL POULTRY TRAILER
Filed Jan. 20, 1967 4 Sheets-Sheet 4

INVENTORS.
ABE NATER
HUGH J. SCARBOROUGH
BY Miketta, Glenny, Poms & Smith
ATTORNEYS.

United States Patent Office 3,476,084
Patented Nov. 4, 1969

3,476,084
LIVE-HAUL POULTRY TRAILER
Abe Nater, 2301 S. Beverly Glen Blvd., Los Angeles, Calif. 90064, and Hugh J. Scarborough, 1401 Carmelita Place, Arcadia, Calif. 91006
Filed Jan. 20, 1967, Ser. No. 610,571
Int. Cl. B60p 3/04; B62d 63/06
U.S. Cl. 119—12                                    10 Claims

ABSTRACT OF THE DISCLOSURE

An apparatus for transporting live poultry from poultry ranches to poultry processing plants where resilient wall assemblies on a mobile support confine the poultry with minimum bruising and injury thereto. Vertically extending laterally resilient preferably plastic rods are positioned in a plurality of frame assemblies bolted upright in a plurality of receptacles welded to the mobile support chassis or frame to provide resilient interior walls of a poultry containing rack, the rods being loosely retained in said frame assemblies laterally thereof.

BACKGROUND OF THE INVENTION

This invention relates in general to truck or trailer devices for transporting poultry, including chickens and turkeys, from outlying poultry growing areas to generally centralized poultry processing areas. More particularly, the present invention relates to a poultry rack and support apparatus for hauling live poultry wherein the interior walls of the rack are particularly adapted to resiliently bend and flex under the impact thereon of poultry being loaded into the rack and thereafter during transportation to minimize injury and bruising thereof.

Poultry raising, particularly with turkeys, is best accomplished in outlying isolated areas far from the cities and industrial areas where the consumer and processor are located. This occurs not only because of the lower cost of the amount of land necessarily used for poultry ranching but particularly to isolate the poultry from possible disease and contamination. Poultry processing plants, on the other hand, are normally located in an industrialized area near labor markets and generally, although not necessarily, proximate to the consumer markets. In order to obtain optimum results, poultry must be delivered live to the processing plants so that the processing thereof may be quickly completed after the poultry is killed. Normally the poultry is either quick frozen for delivery to distant markets or is promptly delivered to meat markets and other consumers the same day the poultry is killed. Since most processing plants are not equipped to house large numbers of live poultry, the poultry normally must be delivered by poultry haulers or transporters in the early morning hours for the prompt processing thereof as outlined above. Furthermore, poultry, particularly turkeys, are the most subdued and quiet during the evening hours and are therefore most easily loaded on transportation vehicles at night. This necessitates the use of live-haul poultry trailers able to drive at high speed over extended distances on highways as well as over the often exceptionally rough and uneven back roads adjacent to poultry raising ranches.

It has been found that in using poultry hauling trailers and trucks in this art, that racking or bending of the prior art poultry trailer and cage constructions have caused metal and material failures where the cages are supported on the truck or mobile support chassis or frames. Such prior art poultry trailers have comprised conventional trucks with rigid wood called cages and simple horizontally slidable board doors for the cages. More recent poultry trailer constructions have employed vertical and horizontal metal frame members welded together into an integral grid work of cage frames. Side walls for the cages have been provided by expanded metal screens or fence-like walls welded to the cage or rack frame. Failure at the welded junctures between the expanded metal walls and frame members have occurred due to the bending or racking of the trailer bodies and poultry cages in traversing the rough terrain adjacent outlying ranch areas as well as travelling over the highway.

In loading poultry, necessarily at night, and frequently in cold inclement weather, the present loading methods require poultry handlers to manually place the poultry in the cages provided in the poultry trailer or rack. The first handler normally picks up a chicken or turkey by the legs and neck and hands it inverted up to a second handler normally standing on a raised platform adjacent the trailer body and poultry rack thereon. The second handler takes the chicken or turkey by the legs from the first handler and swings it up into a selected cage of the poultry rack. Experienced loaders handle the poultry very gently so as not to bruise or injure the poultry in any way. Bruises and injuries to poultry by the handlers or in transportation cause downgrading of the end product causing economic loss to the poultry processor. Inexperienced handlers, and even experienced workers under adverse conditions, tend to overhandle the live poultry, particularly large heavy turkeys, in putting them into the poultry rack cages. Many turkeys and chickens have been damaged by being thrown into relatively hard non-resilient interior walls of the poultry rack. In addition, normally four large turkeys are transported in a single cage on a poultry rack (a greater number of smaller chicken being loaded in the same cage) in order to obtain the optimum economies of transportation thereof. Heretofore, considerable bruising and injury has occurred to poultry during transportation because of the unavoidable jostling and shoving occurring between the poultry contained in any given cage which causes outer extremities of the particular birds to be pushed and rubbed against the cage walls. The expanded metal fencing or screening of prior cage constructions presents a plurality of rough sharp edges and openings bruising, cutting and injuring legs, wings, and bodies of the transported poultry. Such prior trailer constructions have also been extremely difficult to clean of the dirt, feathers and poultry excretions normally occurring.

SUMMARY OF THE INVENTION

The principal objects of the present invention are to disclose and provide a live-haul poultry apparatus including a poultry receiving and containing rack mounted upon a mobile support for transporting live poultry wherein racking and bending of the poultry rack and mobile support will not cause metal fatigue and failure of the interconnected parts, wherein the interior wall constructions provide resilient bendable and generally pliable smooth non-cutting surfaces which will not injure or bruise poultry thrown or pushed thereagainst and which is easily cleaned, maintained, is light in weight and is readily assembled during its construction.

Generally stated, the present invention attains the foregoing objects through the provision of a plurality of poultry rack side wall frame assemblies wherein each such assembly includes a pair of spaced vertical standards and a plurality of generally horizontal cross members extending therebetween. Support or connecting means including box-like receptacles are provided upon the mobile support chassis or frame for receiving and fastening the lower ends of the frame assembly vertical standards therein so as to maintain each of the plurality of frame assemblies generally upright on the mobile support in generally parallel relation to one another. A plurality of laterally spaced series of vertically aligned apertures are provided in the frame assembly cross members and in the generally horizontal floor sections provided in the rack construction. A plurality of laterally resilient vertically oriented rods, preferably made of plastic, are assembled to the frame assemblies, each of the rods being lowered down through a vertical series of apertures through the cross members. The vertically aligned frame assembly apertures and floor section apertures are preferably sufficiently larger than the outer diameter of the vertical rods assembled therethrough so as to allow limited loose lateral movement of the rods therein. Such loose retention of the rods in the frame assemblies promotes the lateral bending or deflecting thereof under the impact of poultry thrown into the poultry rack as well as avoiding material failure between the rods and frame assembly members due to racking and bending of the trailer or mobile support chassis and the poultry rack mounted thereon. The upper and lower ends of the loosely laterally retained rods ars constrained between top and bottom rails provided on each of the frame assemblies, but are not rigidly fixed in position, such rails having rod-end receiving sockets aligned to associated vertical series of apertures to loosely receive the associated rod-ends.

The normally adverse effects of trailer body and rack bending and racking not only have no effect upon the rack side wall frame assemblies and rod connections but also do not effect the novel means of mounting the plurality of frame assemblies to the mobile support chassis as hereinafter more fully explained. The round laterally resilient bendable and pliant rods give under the impact of poultry thrown into the poultry rack so as to reduce bruising and injury thereto, provide no rough surfaces which can cut or abraid the poultry skin or limbs and facilitate the cleaning of any feathers, waste material or other accumulated dirt or material therefrom. The frame assemblies of the present invention are easily fabricated and erected upright in assemblied position on the associated trailer body or other mobile support. The plurality of vertical rods forming the vertical interior walls of the poultry rack are thereafter readily and easily inserted into the frame assembly and cooperatively drilled floor sections. It has been found that according to the method of constructing the poultry rack and trailer apparatus, according to the present invention, that the possible failure of welded joints as in the prior constructions has been eliminated and that relatively unskilled laborers may be employed in assembling the easily fabricated and assembled components of the live-haul, poultry apparatus as more fully described hereinafter.

Various additional advantages and objects of the present invention will become apparent to those skilled in the art from a consideration of the following detailed explanation of an exemplary embodiment of a live-haul poultry trailer apparatus according to the present invention. Reference will be made to the appended sheets of drawnigs in which.

Figure 1:
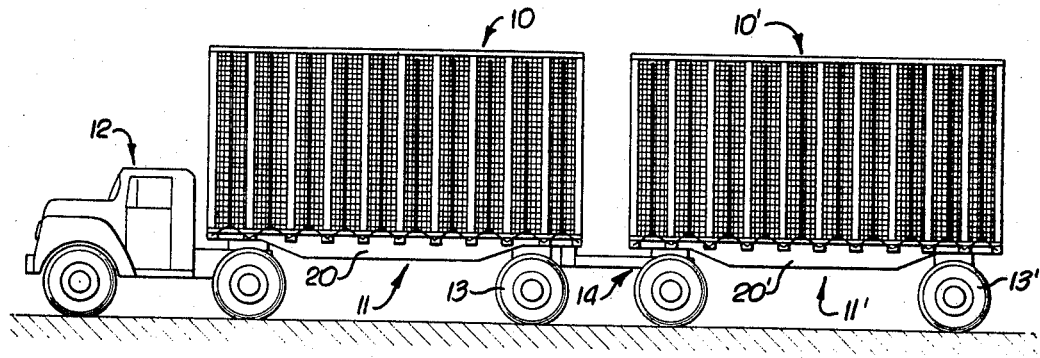
FIG. 1 is an elevational view of an exemplary live-haul poultry apparatus according to the present invention incorporated in a set of trailers adapted to be pulled by a conventional truck cab with a pair of spaced longitudinally extending poultry racks mounted on each trailer bed.
Figure 2:
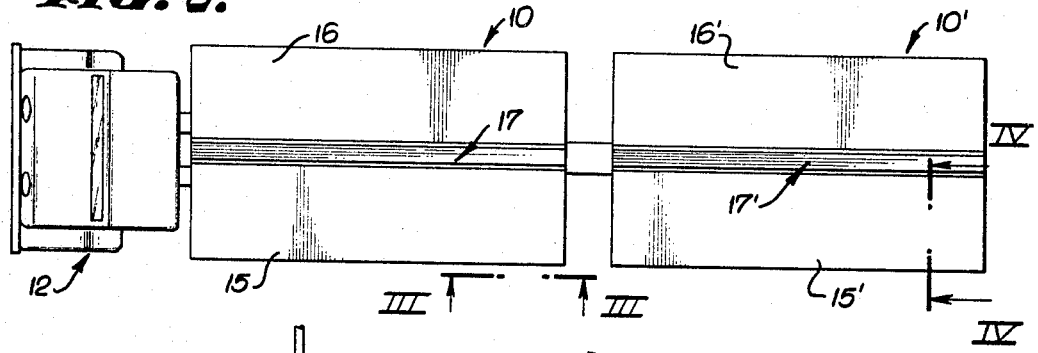
FIG. 2 is a plan view of the apparatus of FIG. 1.

The preferred exemplary embodiment of the live-haul poultry apparatus according to the present invention will now be explained in detail with reference to the appended sheets of drawings. Referring first to FIGS. 1 and 2, the preferred exemplary embodiment of live-haul poultry apparatus, including the provision of poultry receiving and containing racks indicated generally at 10 and 10', is illustrated in combination with a pair or set of trailer beds 11, 11'. It is contemplated that the poultry apparatus of the present invention can be employed on a single truck body, termed a truck mount in the trade, as well as on the trailer beds 11, 11' or any other mobile support.

In the preferred exemplary embodiment, as particularly used in the western United States, the live-haul poultry apparatus is provided in combination with a tandem pair or set of trailers 11, 11' pulled by a conventional truck or cab, indicated generally at 12. The forward trailer, indicated generally at 11, is provided with a main frame supported at its rear end by conventional wheels 13 mounted on a rear axle while its forward end is pivotally mounted to the cab, indicated generally at 12. The rear trailer, indicated generally at 11', also includes a frame having rear mounted wheels 13' with its forward end pivotally mounted to a dolly, indicated generally at 14, which is connected to the rearward end of and pulled by the forward trailer, indicated generally at 11.

Referring now to FIG. 2, it can be seen that each trailer body is provided with a pair of spaced longitudinally extending poultry racks 15 and 16 on the first trailer and 15', 16' on the second trailer. Such spacing of the poultry racks on each trailer allows the provision of a central longitudinally extending air passageway 17 and 17', respectively, in each of the trailer constructions to facilitate circulation of air through the poultry racks as well as the cleaning thereof after use in hauling live poultry.

Figure 4:
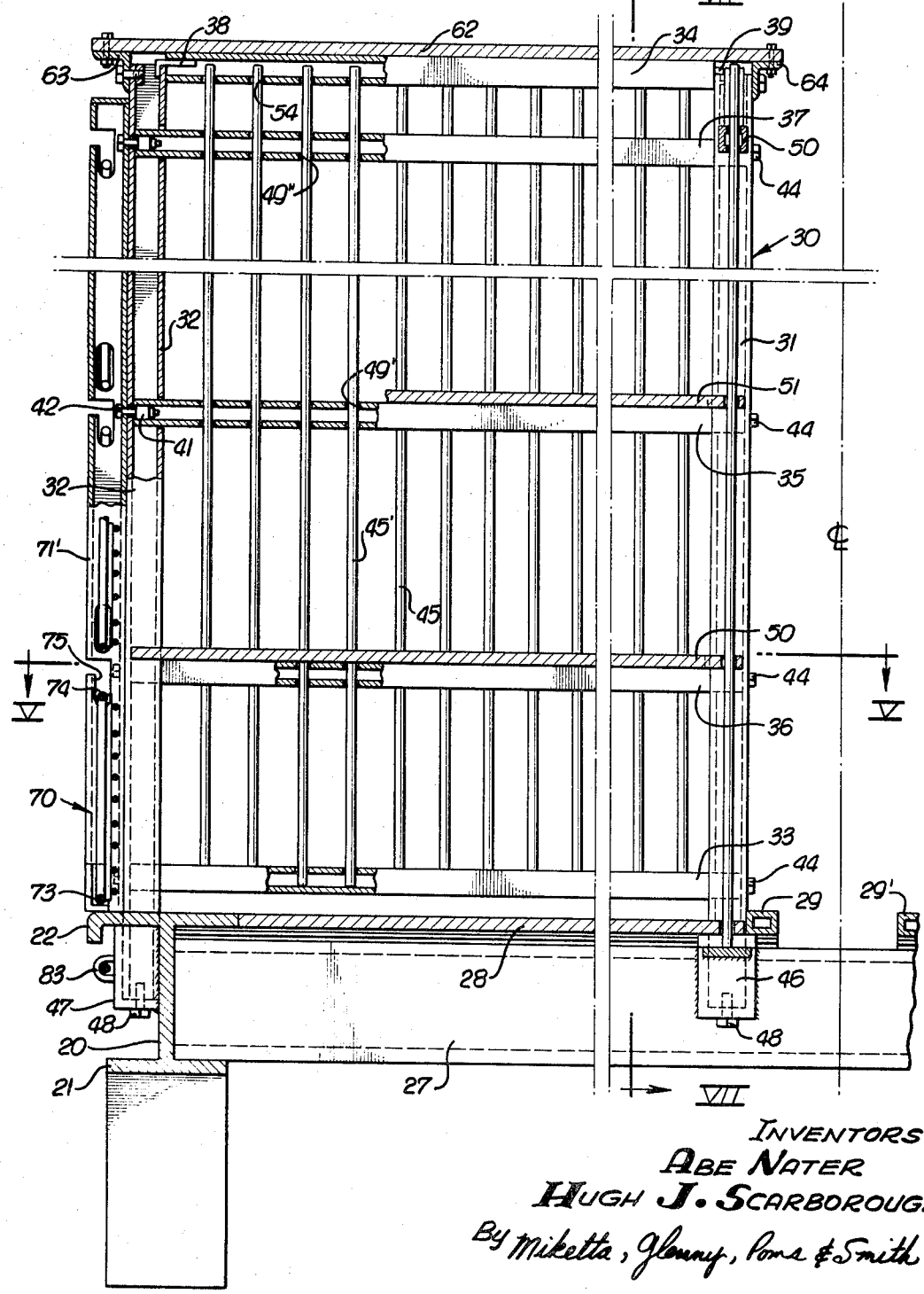
FIG. 4 is a vertical section view of the exemplary poultry hauling apparatus of FIGS. 1 through 3 taken along the plane IV—IV in FIG. 2.
Figure 7:
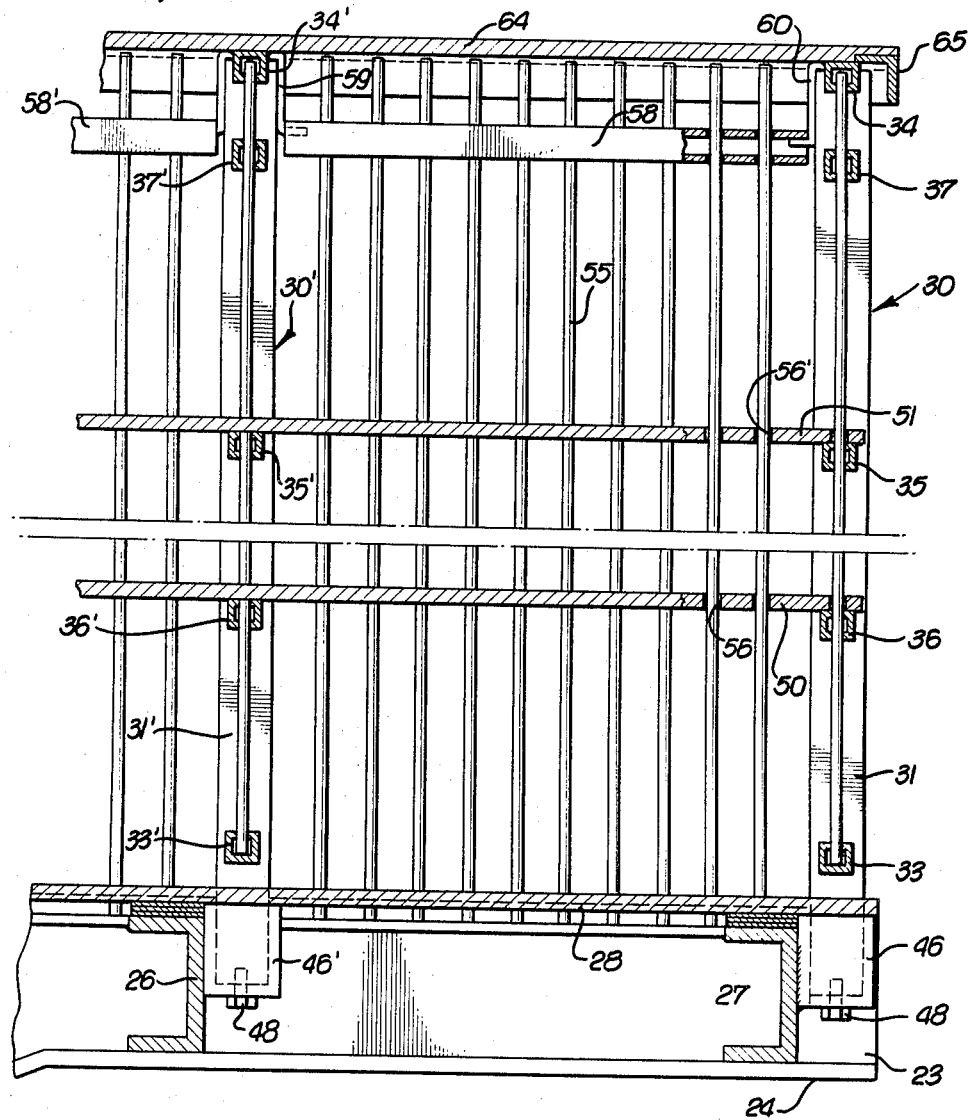
FIG. 7 is a vertical section view of the apparatus of FIG. 4 taken therein along the plane VII—VII showing the interior wall construction of the exemplary apparatus.

Each poultry rack 15, 15' and 16, 16' according to the present invention is constructed of a plurality of resilient rods held in assembled relationship by a plurality of frame assemblies as will now be explained in detail. Referring first to FIG. 4, a plurality of poultry rack side wall frame assemblies, as indicated generally at 30, are mounted to the trailer frames which include a left side I-beam 20, and a right side I-beam main frame member 23 as seen in FIG. 7. Main frame or I-beam members 20 and 23 each include lower flanges 21 and 24 and upper flanges may be turned downwardly as shown in FIG. 4. A plurality of main frame channel cross members are incorporated into the trailer chassis or frame including the cross channels 26 and 27 as seen in FIG. 7. The trailer frame including the longitudinally extending I-beams and channel cross members may be welded together to provide an interval frame mounted by rear axles in conventional manner upon rear wheels 13, 13' as seen in FIG. 1. The wood flooring is provided on the trailer frame or bed with inner bed rails 29, 29' separating the floor into two longitudinal extending sections separated by the central passageways 17, 17' as seen in FIGS. 2 and 4.

Figure 5:
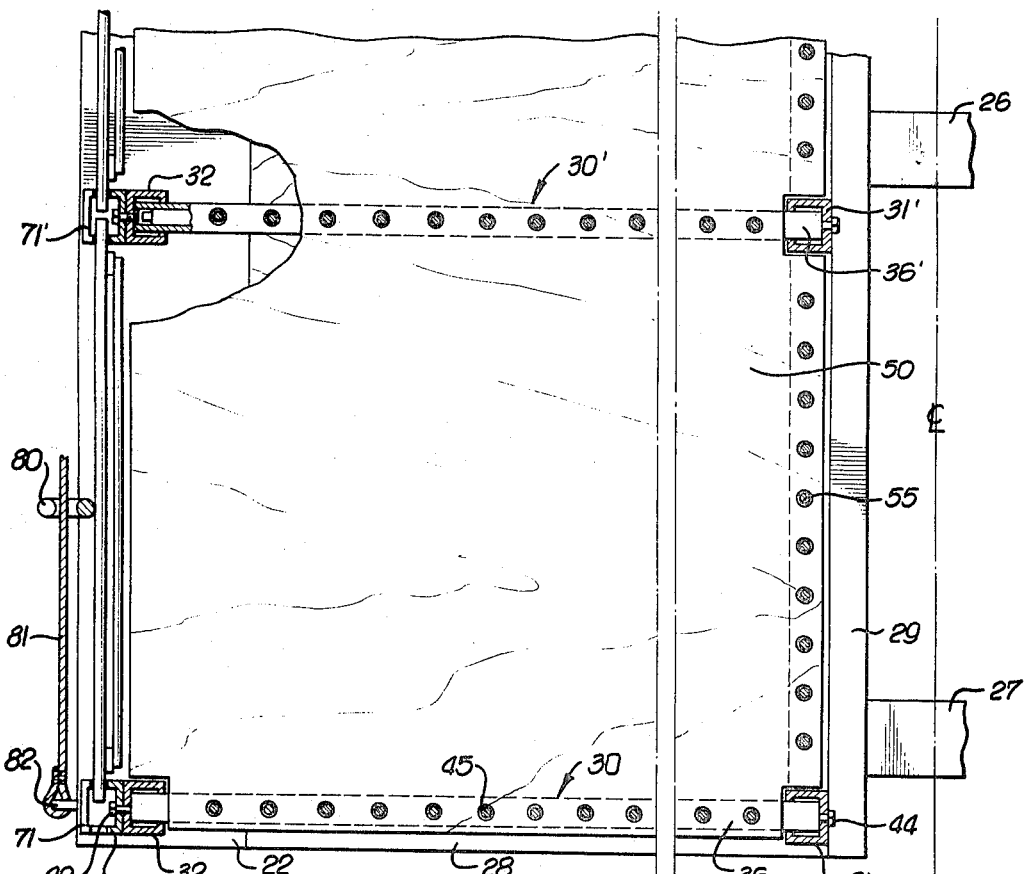
FIG. 5 is a horizontal section view of the apparatus of FIG. 4 taken therein along the plane V—V.
Figure 6:
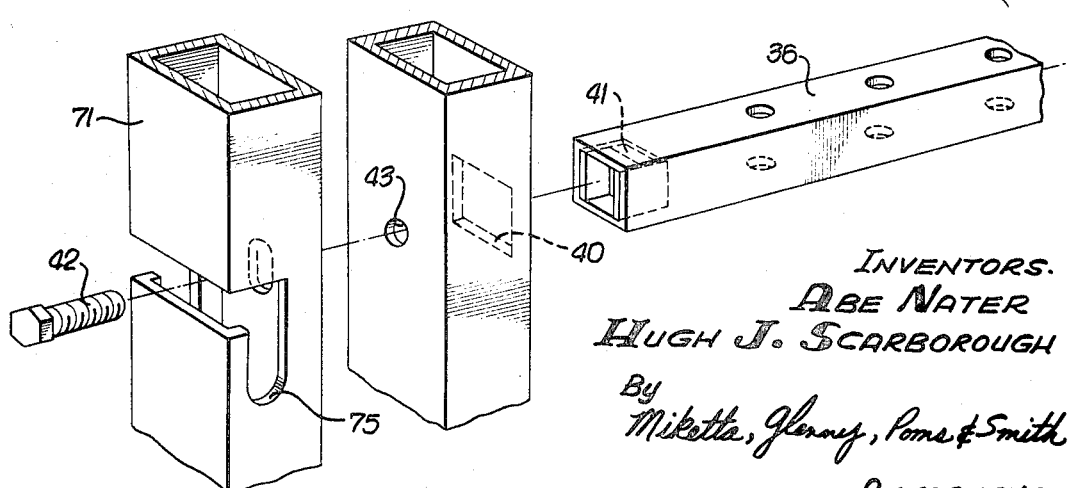
FIG. 6 is an exploded perspective view of a portion of the apparatus of FIG. 5.

Each sidewall frame assembly, indicated generally at 30, includes a pair of spaced vertical standards interconnected by a plurality of generally horizontal cross members extending therebetween. In the exemplary embodiment, as best seen in FIG. 4, the exemplary frame assembly includes the spaced inner and outer vertical posts, stiles or standards 31 and 32 respectively. A bottom horizontal rail 33, and a plurality of generally equally spaced intermediate cross members for rails 35, and 36 extended between, and in the exemplary embodiment into, the spaced side posts or standards 31 and 32. As best seen in FIG. 6, each vertical post or standard, as 32 in FIG. 6, is provided with a rectangular opening 40 to allow the rectangular cross member or rail, as cross member 36 in FIG. 6, to enter into the box like, rectangular cross section standard 32. A threaded bushing 41, provided within each horizontal member or cross rail, is adapted to receive a bolt 42 passing through a bolt hole 43 in the standard 32. As seen in FIGS. 4 and 5, the horizontal rail and cross members are bolted by bolts 42 at the outer standard 32 and by bolts 44 at the inner standard 31.

Figure 8:
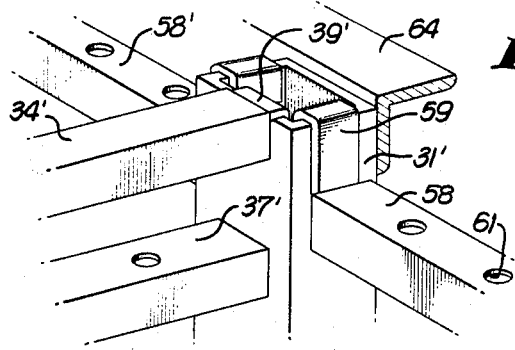
FIG. 8 is a detailed perspective view of a portion of the apparatus of FIG. 7.

The plurality of rods 45, as hereinafter explained, pass loosely through the cross members, as members 35 and 36 and are vertically constrained within the lower and upper cross rails 33 and 34 respectively. In order to prevent inadvertent removal of rods 45 from the upper rail 34, an additional or extra rail 37 is closely spaced to the top rail 34 with the plurality of rods 45 passing therethrough as best seen in FIG. 4. This extra rail 37 is mounted to the inner and outer vertical standards in the same manner as the aforedescribed cross members 35 and 36 and as shown in detail in FIG. 6. The upper rail 34, as best seen in FIG. 8, is suspended between the inner and outer standards 31 and 32 by means of reversely bent flanges 38 and 39 hung over the upper side walls of the standards, as flange 39 overlies the inner side wall of standard 31 in FIG. 8.

Supporting means are provided on the mobile support for trailer bed in the exemplary embodiment for supporting each of the side wall frame assemblies, indicated generally at 30, in spaced upright generally parallel relation (as indicated generally at 30 and 30' in FIGS. 5 and 7) on the mobile support or trailer bed. In the exemplary embodiment, such supporting means includes the provision of box-like receptacles mounted to the trailer frame members to receive and retain the lower ends of the side wall frame assemblies. As seen in FIG. 4, the exemplary frame assembly, indicated generally at 30, is shown with its inner standards 31 received in a box-like receptacle 45 welded to the trailer frame or bed cross member 27 while the outer standard or post 32 is received within the box-like receptacle 46 welded to the longitudinally extending trailer frame I-beam member 20. Threaded bushing means are welded within the lower ends of the standards or posts, in like manner as bushing 41 is provided in the end of the cross member 36 in FIG. 6, to receive bolts 48 inserted upwardly through bolt holes provided in the bottom of the box-like receptacles 45 and 46. The provision of such standard lower end receiving receptacles 45 and 46 on the trailer frame for each inner and outer standard of the plurality of frame assemblies allows their ease of assembly to the trailer bed or frame and their secure fastening thereto by the bolts 48. In addition, such connections between the trailer bed or frame and the side wall assemblies of the exemplary poultry rack allow sufficient relative movement during bending or racking of the truck body and/or frame so as not to cause metal fatigue and failure of the frame assembly members or the supporting means provided on the trailer bed as occurs in conventional integrally welded poultry rack and support constructions.

A plurality of laterally spaced series of vertically aligned apertures are provided in the frame assembly cross members to receive the laterally resilient rods therethrough. As best seen in FIG. 4, a vertical series of apertures 49, 49' and 49" are provided in the cross members shown to loosely receive a rod 45' therethrough. Each of the rods is preferably made of plastic material having a diameter of approximately ⅜ of an inch. It has been found that a rod material of acrylonitrile butadiene styrene sold under the trademark "CY CO LAC" by Jet Plastics Inc. of Los Angeles, Calif., has the desired lateral resiliency for use in the preferred exemplary embodiment. The apertures 49 passing all the way through the tube box-like steel tubing or extruded aluminum cross members have a diameter preferably at least ¹⁄₁₆ of an inch greater than the rod diameter, such apertures having a diameter of approximately ⁷⁄₁₆ of an inch in the preferred embodiment. The individual floor sections assembled to the erected frame assemblies prior to the running of the rods thereinto are also provided with similar sized vertically aligned apertures to allow loose passage of the rods therethrough. While a resilient plastic material is preferred, the rods may be constructed from other materials which will resiliently yield when subjected to lateral pressures in their loosely received and relatively unconstrained positions. For example, thin wooden rods of sufficient flexibility to permit laterally yielding when a bird is urged thereagainst may be used if desired.

As seen in FIGS. 4, 5 and 7, intermediate floor sections, as sections 50 and 51, are supported on the side wall frame assembly cross members, as members 35 and 36 in the exemplary embodiment. In the preferred embodiment, each poultry rack is provided with seven tiers or levels of cage areas and thus include six levels of cross members and associated intermediate floor sections. Each intermediate floor section, as seen in FIG. 5, may be made of plywood treated to be sealed against the absorption of moisture and extend between the outer and inner edges of the rack and between the spaced cross members. In the preferred exemplary embodiment, there are 10 longitudinally separated cage portions, each portion separated by a side wall formed by the rods 45 held in assembled relation by the frame assemblies, indicated generally at 30, but more or less cage portion may be provided. An individual cage area is defined by its spaced side walls and its upper and lower associated floor sections and extends from the outer edges provided by the associated standards, as standards 32 and 32' in FIG. 5, to the inner edges defined by the inner associated standards, as standards 31 and 31' in FIG. 5.

Rods 45 are held in assembled but laterally loose engagement by the frame assemblies as hereinabove described and by the provision of the upper and lower retaining rails, as rails 33 and 34 in FIG. 4. Each of the bottom and top rails of the plurality of frame assemblies, according to the present invention, include a plurality of rod end receiving sockets aligned to the spaced series of apertures in the cross members, as the exemplary series of apertures 49, 49' and 49" of FIG. 4, to receive and vertically constrain the associated rods. As seen in FIG. 4, the lower rail 33 of the frame assembly, indicated generally at 30, includes the rod end receiving sockets 53 while the top rail 34 is provided with opposed aligned rod end receiving ports or sockets 54.

Because of the box like construction of the rail members 33 and 34, the provision of the ports 53 and 54 allows the received rod ends to abut the opposite inner side walls to vertically constrain the rods 45. The ports or sockets 53 and 54 are preferably provided with an inner diameter approximating that of the apertures through the cross members and floor sections so that the rod ends will also be loosely restrained in a lateral direction relative to the poultry rack to allow limited free lateral movement during resilient bending of the rods due to the movement of live poultry contained therein and/or the bending or racking of the overall rack and trailer frame constructions during transportation over uneven or bumpy highways and roads.

The interior wall for the poultry rack construction, according to the present invention, is also provided by a plurality of laterally resilient rods 55 assembled between the interior frame assembly standards 31, 31' etc., as seen in FIGS. 4 and 7, by aligned floor section apertures, mobile support or truck bed flooring sockets and ported interior rail members interconnected between and joining adjacent interior standards of the assemblies. As seen in FIG. 7, a series of vertically aligned flooring apertures, as apertures 56 and 56', are provided in the various vertical tiers of flooring sections aligned to a support or trailer bed floor socket, as socket 57 provided in trailer floor 28. An interior longitudinally extending ported interior rail member 58 is suspended by reversely bent flanges 59 and 60 on the upper ends of the adjacent inner standards or posts 31 and 31'. Rail member 58, as best seen in FIG. 8, is provided with ports or apertures 61 to receive and laterally, loosely restrain the upper ends of the rods 55.

The roof 62 is supported on the assembled frame assemblies by the upper rails 34 and by the longitudinally extending side angle irons or roof rails 63 and 64, as seen in FIG. 4, and end angle irons or roof rails, as roof rail 65 in FIG. 7.

Figure 3:
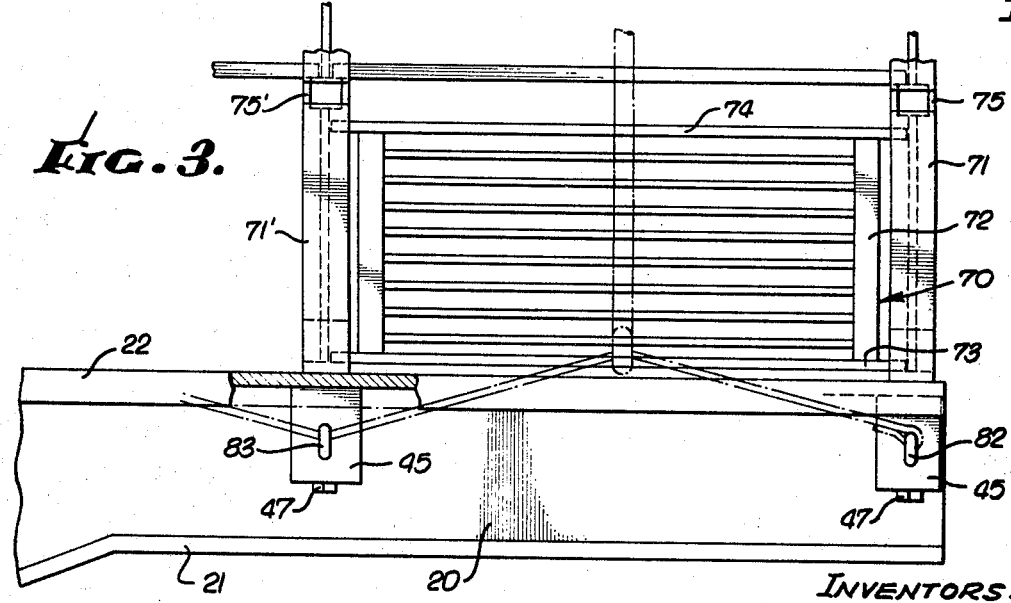
FIG. 3 is a detailed view of an exemplary cage door construction for the poultry rack of the apparatus of FIGS. 1 and 2 taken in the plane III—III in FIG. 2.

Individually operable cage doors, indicated generally at 70 in FIGS. 3 and 4, are provided for each of the cage sections of the preferred exemplary embodiment of poultry rack. As seen in FIGS. 4 and 5, a vertically extending door hinge means 71 is provided on the outer side wall of each frame assembly outer standard or post 32, being mounted thereto by the aforementioned bolts 42 as best seen in FIG. 6. Such door hinge means 71 may be made from a single square tubing or from two channel members nested together to provide a rectangular cross section. As seen in FIG. 3, such hinge means or members 71 pivotally mount conventional cage doors or grills by lower cross rods 73 pivoted thereto. The door upper cross rods 74 are adapted to be received in upwardly and outwardly opening slots provided in the hinge members 71, as slots 75, 75' seen in FIGS. 3, 4 and 6.

Each of the cage doors is held in closed locked position by conventional vertically disposed locking bars, as conventionally used and known in the trade, are hinged at the top gate door by a top hook on the locking bar, connected by an intermediate hook thereon engaging an intermediate door and have a lower eye portion 80 through which a locking wire 81 passes. The ends of the locking wire 81 are fastened to a portion of the truck body, as the stationary eye 82 secured to the receptacle 46, and pass through additional stationary eye members 83 provided on the intermediate post receptacles, such as 47 in FIG. 3. By tightening the locking wire 81 by toggle means in a known manner, the individual cage doors, indicated generally at 70, may be held in locked position for any vertical series of cage sections.

In assembling the live-haul poultry trailer or apparatus of the preferred exemplary embodiment, the trailer frame or bed is first fabricated in otherwise conventional manner but with the additional provision of the standard or post receiving receptacles or pockets, as receptacles 46 and 47, to receive the lower ends of each of the inner side wall frame assemblies. Each frame assembly is then fabricated by assembling the spaced side ported standards or posts with the interconnected vertically ported cross members and lower rail member with the socket or rod end receiving openings. Each frame assembly including such standards, cross members and lower rail, somewhat resembling a ladder, is then assembled to the trailer frame by placing the standard lower ends into the associated receptacles or sockets and tightening the receptacle bolts, as bolts 48. Thereafter the various floor sections, as assembled to the assemblies, with the floor apertures either pre-drilled or drilled right on the assemblies. It is convenient to drill the holes through the floor sections after they have been secured to the frame assemblies to assure proper alignment of the floor apertures to the laterally spaced series of vertical rod receiving apertures in the assembly cross members as hereinbefore explained. The upper rail member, as rail 34 in FIG. 4, is not assembled until after the plurality of rods 45 are run down through the laterally spaced series of apertures in the assembly cross members.

After the frame assembly, with the exception of the top rail, as rail 34 of FIG. 4, have been erected in upright parallel relation upon the trailer frame or bed, all of the rods may be inserted from overhead down into the series of aligned apertures of the assembly cross members into the bottom rail aligned sockets. Thereafter each of the top rails, as rail 34 in FIG. 4, are assembled to cap the top ends of the plurality of rods 45 by merely sliding the top rail reversely bent flanges 38 and 39 over the inner walls of the upwardly open standards 32 and 31 respectively. The roof 62, thereafter applied on flanges 63 and 64, overlies the flanges 38 and 39 and holds the top rails, as rails 34 in FIG. 4, in place. The plurality of rods 45 are thus vertically constrained within the respective side wall frame assemblies but laterally resilient to allow bending thereof.

The door hinge providing means or members, as members 71 and 71', may be assembled to the outer standards or posts of each frame assembly at any time during the assembly procedures by merely removing the bolts 42, positioning the hinge providing member against the standard or post and reinserting or turning down the bolts 42.

The foregoing detailed explanation of a preferred embodiment of a live-haul poultry trailer apparatus is intended to be exemplary in nature only and it should be understood that varous alternatives or equivalent means and embodiments and methods may be employed within the scope of the present invention. For example, the mobile support disclosed may take the equivalent forms of a truck bed, trailer, railroad car flat bed or any other cooperating interconnected rack support susceptible of supporting the rack whether in fact mobile or stationary during use. Also, the rack and support apparatus is not necessarily limited to the hauling of only live-poultry but may be adapted to other uses.

We claim:
1. A live-haul poultry apparatus including a poultry receiving and containing rack with an interconnected mobile support for transporting live poultry wherein the improvement comprises the provision of:

a plurality of poultry rack side wall frame assemblies wherein each of said frame assemblies includes a pair of spaced vertical standards and a plurality of generally horizontal cross members extending therebetween;

supporting means provided on said mobile support for supporting and interconnecting said side wall frame assemblies to said mobile support in spaced upright generally parallel relation thereon;

a plurality of laterally spaced series of vertically aligned apertures in said frame assembly cross members;

a plurality of laterally resilient vertically oriented rods assembled to said frame assemblies, each of said rods extending through one of said series of apertures through said cross members; and means for restraining opposite ends of said rods against axial movement vertically outwardly of said assemblies while allowing vertically inwardly movement of said ends to facilitate lateral flexure of said rods relative to said assemblies when impacted by live poultry carried in said rack.

2. The live-haul poultry apparatus of claim 1 wherein: said apertures through said cross members are sufficiently larger than the diameter of said rods extending therethrough so that said rods are allowed loose limited lateral movement therein.

3. The live-haul poultry apparatus of claim 1 wherein said means for restraining opposite ends of said rods comprise:

top and bottom rails extending between said standards provided in said rack side wall frame assemblies; and a plurality of rod end receiving sockets provided in said top and bottom rails aligned to said spaced series of apertures in which said rods are vertically constrained.

4. The live-haul poultry apparatus of claim 3 wherein: said aperture in said frame assembly cross member are provided with a diameter at least one sixteenth of an inch larger than the diameter of said rods allowing limited lateral movement of said rods relative to said cross members.

5. The live-haul poultry apparatus of claim 3 wherein: an additional cross member is disposed between said standards of said frame assemblies generally adjacent said top rails thereof to laterally restrain upper end portions of said rods against inadvertent removal from the associated top rail rod end receiving sockets due to lateral bending of said rods by live poultry carried in said rack.

6. The live-haul poultry apparatus of claim 1 wherein: said standard supporting means on said mobile support includes a plurality of box-like receptacles mounted to frame members of said mobile support and said side wall frame assembly spaced standards are mounted thereto by inserting and fastening lower ends of said standards within said receptacles.

7. In a live-haul poultry rack construction for use in transporting live poultry from poultry raising areas to poultry processing plants, the provision of a highly resilient interior wall construction comprising:
a plurality of laterally resilient plastic rods;
a plurality of frame assemblies wherein each of said assemblies includes means for loosely retaining a group of said rods in generally parallel, spaced planar array to provide a resilient interior wall of said rack; and
means associated with said assemblies for restraining the upper and lower ends of each of said rods against movement outwardly of said assemblies but allowing inward movement thereof upon lateral flexure of said rods relative to said assemblies upon their being impacted by poultry being transported therein.

8. A method of constructing a live-haul poultry trailer for use in transporting live poultry comprising the steps of:
assembling a trailer frame with longitudinal and cross frame members and welding a plurality of upwardly opening box-like receptacles to said frame members;
fabricating a plurality of side wall frame assemblies with spaced vertical side posts and interconnecting cross members having vertically aligned ports and erecting said assemblies on said trailer frame by inserting lower ends of said posts into said receptacles;
running a plurality of laterally resilient rods of smaller diameter than said ports from above said side wall frame assemblies down through said ported cross members; and
assembling top rails to said side wall frame assemblies to cap upper free ends of said rods to vertically constrain said rods within said assemblies.

9. A live-haul poultry apparatus comprising a poultry rack structure including a plurality of interconnected vertical and horizontal members arranged to provide a plurality of stacked cages, the improvement comprising:
a plurality of laterally yieldable and resilient rods arranged to extend for substantially the entire vertical height of said poultry rack structure to form the walls of said stacked cages, said rods being loosely received and laterally supported within vertically aligned holes in said horizontal members and being restrained only against vertical movement outwardly of said assemblies at their upper and lower ends.

10. The live-haul poultry apparatus of claim 9 wherein: said rods have a smooth, non-abrasive surface and are cylindrical in shape, and
said holes are circular in cross-section and of a diameter larger than the diameter of said rods whereby said rods are unrestrained for slight lateral movement and for free rotation about their vertical axes.

References Cited

UNITED STATES PATENTS

| | | | |
|---|---|---|---|
| 1,106,267 | 8/1914 | Wilson | 119—17 |
| 1,159,843 | 11/1915 | Johnson | 119—12 |
| 1,520,504 | 12/1924 | Mudd | 119—12 |
| 1,914,913 | 6/1933 | Ferris. | |
| 2,099,774 | 11/1937 | Spencer | 119—12 |

HUGH R. CHAMBLEE, Primary Examiner

U.S. Cl. X.R.

119—17